Oct. 13, 1964 C. E. ROBERTS 3,153,229

DIGITAL ACTUATOR AND DIRECT DIGITAL TRANSDUCER EMPLOYING SAME

Filed May 13, 1963 2 Sheets-Sheet 1

INVENTOR.
CHARLES E. ROBERTS
BY Fulwider, Patton, Rieber, Lee, and Utecht
ATTORNEYS Oct. 13, 1964 C. E. ROBERTS 3,153,229

DIGITAL ACTUATOR AND DIRECT DIGITAL TRANSDUCER EMPLOYING SAME

Filed May 13, 1963 2 Sheets-Sheet 2

INVENTOR.
CHARLES E. ROBERTS
BY Fulwider, Patton, Rieber, Lee, and Utecht.
ATTORNEYS United States Patent Office 3,153,229

Patented Oct. 13, 1964

3,153,229

DIGITAL ACTUATOR AND DIRECT DIGITAL TRANSDUCER EMPLOYING SAME

Charles E. Roberts, 3756 May St., Los Angeles, Calif.

Filed May 13, 1963, Ser. No. 279,921
18 Claims. (Cl. 340—347)

The present invention relates to a digital actuator which converts a digital signal into a physical manifestation which is a combination of digital increments and to a direct digital transducer employing the same in a closed loop or balance system to convert an analog physical input directly to its corresponding electrical digital output and which is also capable of performing the inverse of this action.

Sensors with digital outputs have wide applications, not only being directly compatible with digital computers, but also being useful in non-computer applications such as digital control systems. Digital data can be transmitted, stored and read repeatedly with little loss in accuracy and this form of information is required in computer equipment which is capable of operating only on numerical data. Analog physical phenomena must be converted to a numerical digital format to provide information signals which can be operated on by the computer equipment. Simple and high accuracy digital control systems can also be made responsive to the output of the digital transducer system.

Analog to digital electrical systems are in use where physical phenomena are converted into analog electrical signals which are then fed through an analog to digital converter to change the analog electrical signals into digital electrical signals. Such analog to digital converters, however, are relatively expensive where high accuracy is desired and add undesirable complexities to the circuitry.

In the direct digital transducer according to the present invention it is unnecessary to convert to analog signals at any point in the system so that the output is inherently more accurate than in systems wherein analog signals must be converted to a digital output.

The direct digital transducer according to the present invention employs a condition-responsive sensor in which a change in the condition provides an error signal which is interpreted by automatic or maual logic to effect selective energization of a digital actuator to return the system to its null point. The energization of the digital actuator is according to a selected digital code and gives a direct digital read-out of the value of the analog condition. Any of the known digital codes may be used, such as binary, binary coded decimal, Gray code, decimal, octal or other, and for the purposes of illustration and description of exemplifications of the present invention, the binary code is used.

The digital actuators selected for illustration and description herein are electro-strictive and magneto-strictive types which contract upon the application of electrostatic and magnetic fields thereto. These actuators have very fast response times of the order of fractions of microseconds, while their changes in physical length upon change in the electrostatic and electromagnetic fields may be determined to an accuracy of microinches. These highly accurate and fast acting strictive elements are used to create physical displacements matching those caused by an unknown physical quantity.

The digital transducer of this invention utilizes a highly accurate displacement sensing means sensitive to small physical movements. The sensor selected for illustration and description herein is an interferometer arrangement in which coherent light beams are used to create interference patterns establishing dark bands or "fringes" which move with respect to photoelectric cells in response to a change in the physical condition. Other sensors having the required sensitivity and speed of response may obviously be utilized in the balance system of the transducer.

It is therefore a primary object of the present invention to provide a new and improved direct digital transducer.

Another object of this invention is to provide an improved direct digital transducer having an accuracy and speed of response comparable with that of computer equipment.

Another object of this invention is the provision of an improved digital transducer providing a digital signal output from an analog physical condition without converting at any level to an analog signal.

A further object of this invention is the provision of an improved direct digital transducer employing a balance system, with a digitally operating actuator for restoring system balance and providing by its digital energization a digital measure of the condition which created the unbalance of the system.

A still further object of this invention is the provision of an improved direct digital transducer employing a balance system, with a digital actuator operating to correct an imbalance caused by a change in a physical condition and having automatic sampling means for energizing the digital actuator and providing by its energization a digital read-out of the condition value.

Yet another object of the invention is the provision of an improved direct digital transducer employing a balance system, an interferometer sensor of an imbalance in the system, a digital actuator for correcting the imbalance, and a readout of the energization of the actuator to provide a digital figure for an analog physical value.

Another object of the invention is an improved actuator providing a physical displacement in digital increments in response to digital application of electrostatic or magnetic fields.

Yet another object of the invention is the provision of an improved digital actuator comprising an expandable and contractable element of an electrostrictive or magnetostrictive material and means for establishing electrostatic or magnetic fields for the element, in which the fields are establishable in values corresponding to a digital code to produce movement of the element in digital increments.

These and other objects and features of the invention will be readily apparent to those skilled in the art from the following specification and the appended drawings, in which.

Figure 1:
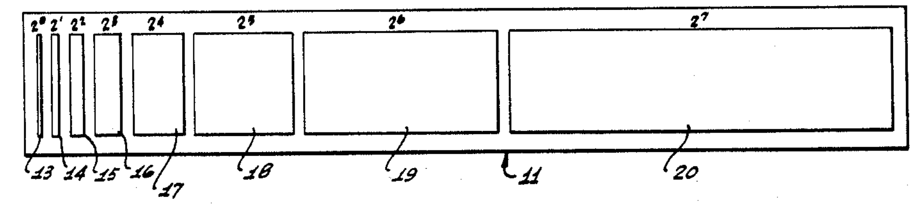
FIGURE 1 is a somewhat schematic representation of an electrostrictive digital actuator according to the present invention, shown in plan.
Figure 2:
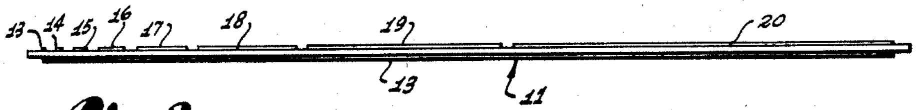
FIGURE 2 is a side elevational view of the digital actuator of FIGURE 1.

Referring first to the digital actuator 11 of FIGURES 1 and 2, an electrostrictrive element is shown as an elongated flat plate 12 which may be formed of any desired electrostrictive material, for example, an electrostrictive ceramic such as barium titanate. On one face of the plate 12 is mounted a continuous strip electrode 13 of electrically conductive material which is common with respect to the electrostatic fields to be set up through the actuator element. On the opposite face of the element 12 are mounted a plurality of electrode plates of varying area according to a selected digital code. For purposes of illustration, eight electrode plates have been shown which are numbered 13 through 20, corresponding to the digital numbers in binary code from $2^0$ to $2^7$. It will of course be understood that any desired number of electrodes may be used, depending upon the number of places to which the digital number is to be extended and that the area of the electrodes may conform to any selected digital code.

In the binary code illustrated, the area of electrode 13 is taken as a standard unit and conforms to the digital number $2^0$. Electrode 14 is twice the area of electrode 13 and conforms to the digital number $2^1$. Electrode 15 conforms to the digital number $2^2$ and has an area four times the standard unit area of electrode 13. The areas of the remaining electrodes increase in binary progression to the higher significant numbers, with 19, for example, corresponding to digital number $2^6$, having an area 64 times the standard unit area of plate 13.

When electrodes on opposite faces of the actuator element 12 are electrically energized, an electrostatic field will be passed through the element which will contract in a direction at right angles to the field. The amount of movement is dependent on the extent of the field, given a constant field strength, so that the length of the element 12 will decrease in digital increments as successive ones of the plates 13–20 are electrically energized. Inversely, as the plates are selectively deenergized, the electrostrictive element 12 will expand in digital increments in accordance with the areas of the electrodes concerned. The longitudinal movements of the element 12 are preferably linear with respect to the areas of the electrostatic field impressed on the element so that the electrodes may vary in area in binary progression, as previously described. On the other hand, with an electrostrictive material whose physical movements are not linear with respect to the field area, the electrode areas may be selected to effect movement of the actuator element in binary increments.

Electrode 13 is preferably continuously connected to a direct current source by a suitable electrical connector thereto and the electrodes 13–20 are selectively connected to the source by individual conductors so that they may be independently energized. It will be seen that energization of the electrodes of the actuator 11 corresponding to a given digital number will effect a physical positioning of the electrostrictive element 12 corresponding to, and unique with respect to, that digital number. Therefore, the value of the digital number in accordance with which the electrodes are energized may be determined by this unique position or dimension of the electrostrictive element.

Figures 3, 5, 6:
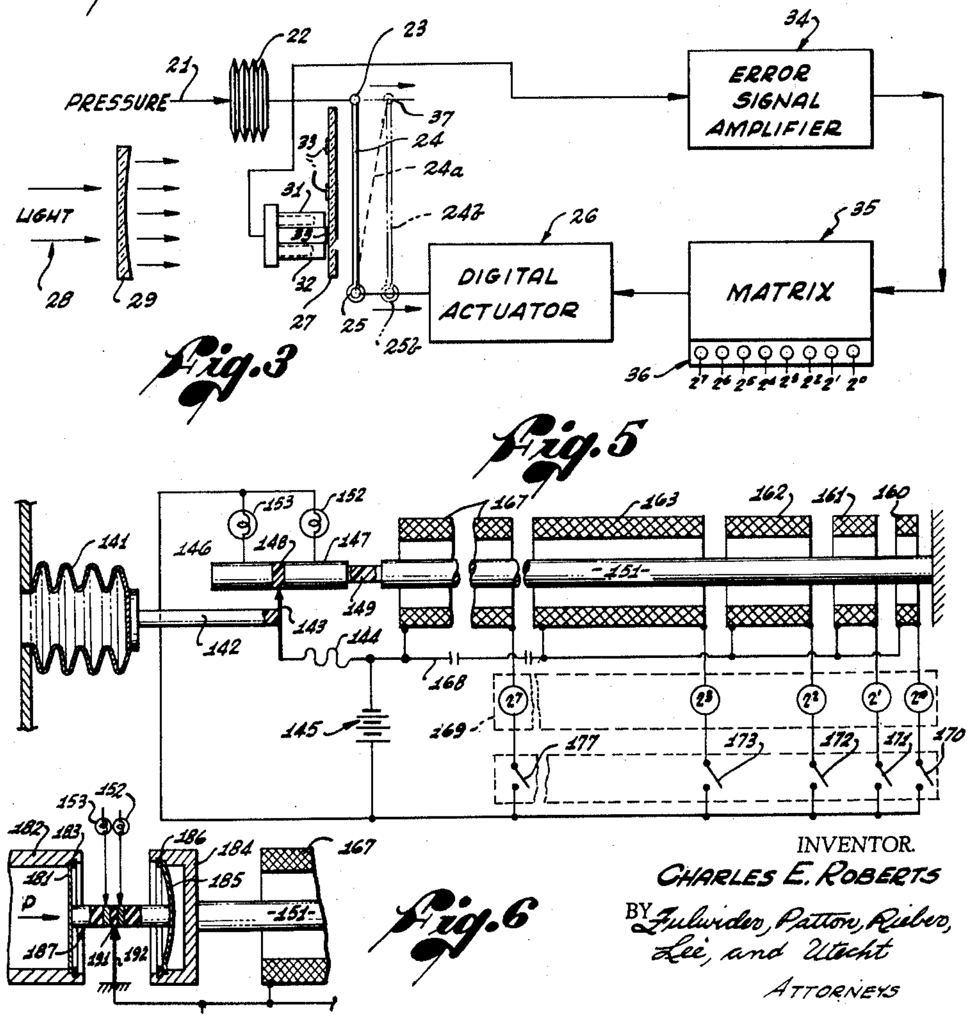
FIGURE 3 is a schematic and block diagram of the major operating components of a direct digital transducer according to the present invention.
FIGURE 5 is a schematic representation of a magnetostrictive direct digital transducer according to the present invention, illustrating a simple manual matching to secure a direct digital output.
FIGURE 6 is a partial schematic representation, similar to FIGURE 5 in the unillustrated portion, of force-balance positioning in a direct digital transducer.

Referring now to FIGURE 3, the diagrammatic and block representation is of a direct digital transducer according to the present invention giving a digital read-out or output of the value of an analog physical condition. By way of example only, the physical condition is indicated as a varying pressure 21 applied to a bellows device 22 which is mechanically connected to move the edge 23 of a mirror 24. The opposite edge of mirror 24 is pivotally mounted at 25 so that the mirror will tilt upon movement of bellows 22 in response to a change in the pressure 21. The pivot 25 is mechanically connected to be bodily moved by a digital actuator 26 which may conform to the digital actuator 11 previously described.

In front of the mirror 24 is mounted a semi-transparent or partially silvered mirror 27 forming, with the mirror 24, an interferometer illuminated from a light source, indicated generally at 28, the light from which is collimated by a lens 29 and directed substantially normal to the mirrors 27 and 24. Some of the light passing from the source 28 through the lens 29 will also pass through the semi-transparent mirror 27 to be reflected from the mirror 24. The remainder of the light is directly reflected from the mirror 27. The light beams reflected from the two mirrors 27 and 24 are coherent and, since the mirror surfaces are not optically flat, create interference patterns providing spaced dark bands known as "fringes" in interferometry. When the mirror 24 is tilted out of parallelism with the mirror 27, these dark bands or fringes move and this movement is detected by placing a pair of photoelectric cells 31 and 32 optically at opposite sides of a band or fringe, as shown in FIGURE 3.

The system of FIGURE 3 is shown in balance with the band or fringe 33 directly between the photocells 31 and 32 so that both have a high current output, resulting in a zero error signal. The signal from the pick-up may be amplified as indicated at 34 and fed to a matching matrix which determines the energization of the digital actuator 26. An output register 36 gives a digital read-out or output.

The dark bands or fringes 33 have a sharper definition when a monochromatic or single frequency light source is used at 28. For practical purposes, this may be approached by using a mercury vapor lamp for the source. It will be understood that the scale of FIGURE 3 has been greatly exaggerated, since the movements under consideration are of the order of microinches.

When an increase in pressure 21 occurs, the bellows 22 expands and moves the edge 23 of mirror 24 into the position 37, the mirror 24 thereby tilting about pivot 25 into the position 24*a*. This movement of the mirror 24 out of parallelism with the mirror 27 causes the fringe 33 to move to darken the photocell 31 to give an error signal in the low circuit fed into the matrix 35. The error signal amplifier 34 cooperates with the photocells 31–32, as will be explained in the logic diagram of FIGURE 4, to effect an appropriate output from the amplifier when the current in a photo tube decreases. The matrix 25 energizes the digital actuator 26 in accordance with the output of the error signal amplifier to move the pivot 25 into the position 25*b* where the mirror 24 is in position 24*b* and again parallel to mirror 27. The system is thereby returned to balance, with the band or fringe 33 again located optically between the photo tubes 31, 32.

The amount of energization of the digital actuator 26 required to move the mirror 24 back into parallelism establishes a digital output signal in the register 36 at the terminals thereof labeled in binary code. It will be readily understood that, as in computer operation, suitable visible signals, such as lights, may be energized with the terminals to give a direct visual read-out of the digital value, as well as the electrical signal read-out provided by the energized terminals.

Referring now to the logic diagram of FIGURE 4, the outputs of the photoelectric cells 31 and 32 are fed to amplifiers 41 and 42, respectively, and the outputs of amplifiers 41 and 42 are triggering inputs to a bistable multivibrator 43, hereinafter referred to as the interferometer flip-flop. For simplicity of expression, bistable multivibrators will hereinafter be referred to as "flip-flops" throughout.

The amplifiers 41 and 42 are biased to be non-conducting when their associated photo-cells are conducting, and to have an output when the current through the associated photo-cell decreases. The output of the interferometer flip-flop is continuous in the line for which a triggering signal is last received.

The output of the flip-flop 43 triggered by amplifier 41 is connected to a "low" signal line 44 and the other output to a "high" signal line 45. The "low" signal line 44 is connected to one input of each of the "low" AND gates 50 through 57 corresponding, respectively, to digital numbers of progressively increasing significance. The "high" signal line 45 is connected to one input of each of the "high" AND gates 60 through 67 corresponding, respectively, to digital numbers of progressively increasing significance.

A ring counter is shown at 46 having an input at 47 and a reset at 48. The ring counter is a standard component made up of a loop of interconnected flip-flops, only one of which is in a specified state at any given time. Each input pulse advances the specified state one position in an ordered sequence around the loop. The outputs 71 through 86 of the ring counter 46 pass successive pulses, in that order, in response to triggering clock pulses fed into the input 47. These clock pulses are fed from a generator, indicated generally at 87, to the normal input of an inhibit AND gate 88 and thence to the ring counter input. The ring counter outputs 85, 83, 81, 79, 77, 75, 73 and 71 are connected, respectively, to the other inputs of the "low" AND gates 50 through 57. The ring counter outputs 86, 84, 82, 80, 78, 76, 74 and 72 are connected, respectively, to the other inputs of the "high" AND gates 60 through 67.

The outputs of the "high" AND gates 60 through 67 are connected to one input of "high" OR gates 90 through 97, respectively. The other inputs of the "high" OR gates 90 through 97 are connected to a reset line 98. The outputs of the "low" AND gates 50 through 57 are connected to the set inputs of the register flip-flops 100 through 107. Both outputs of the register flip-flops 100 through 107 are fed to reset OR gates 110 through 117, respectively. The outputs of the reset OR gates 110 through 117 are fed to the trigger inputs of the digital actuator control flip-flops 120 through 127, respectively. The reset inputs of the flip-flops 120 through 127 are connected to a reset line 128.

The outputs of the digital actuator control flip-flops 120 through 127 are schematically illustrated as connected directly to the electrode plates 13 through 20, respectively. A power source has not been illustrated in the logic diagram and it is to be understood that the output of the digital actuator control flip-flops 120 through 127 may control power switching devices, such as silicon control rectifiers or other intermediate devices, for switching on and off direct current power to the actuator electrodes. For logic purposes, the electrodes have been shown as if fed directly from the control flip-flops, but it will be understood that the outputs of the control flip-flops 120 through 127 represent connection of an associated actuator electrode to a direct current power source whenever there is an output from a control flip-flop.

The lines representing energization of the actuator electrodes are also connected to the terminals of the output register 36 so that these terminals will be energized when the corresponding actuator electrodes are energized. The output register thereby provides an electrical signal read-out which is digital in character and gives the digital value of the analog condition being measured. It will be understood that the output register may include lights in parallel with its terminals to give a direct visual digital read-out of the value of the condition.

The logic matrix so far described is directed to conduct a new matching operation to give the digital value of the analog condition by means of a pulse fed to a line 129 from a programmer or other source indicated generally at 131. The line 129 is connected to both a delay element 132 and the inhibit input of the inhibit AND gate 88. The output of the inhibit AND gate 88 is connected not only to the ring counter input 47 but also to one input of a reset delay flip-flop 133. The other input to flip-flop 133 is connected to the output of delay element 132. The output of flip-flop 133 is fed to the ring counter reset 48 and to the reset lines 98 and 128, being connected to the reset line 128 through a delay element 134.

The operation of the direct digital transducer of FIGURES 1 through 4 will now be described, starting after a cycle has just been completed and all flip-flops have been cleared to the reset condition following receipt of a read pulse on line 129.

Assuming that an increase occurred in pressure 21, the bellows 22 will expand to tilt the mirror 24 and move the band or fringe 33 to obscure the "low" photo-cell 31, whose output current therefore decreases to the point where an output occurs from amplifier 41 to interferometer flip-flop 43 to energize the "low" signal line 44. Clock pulses will be arriving continuously at the input of the inhibit AND gate and will have uniform spacing. Arrival of the first clock pulse of a new measuring cycle will produce an output from terminal 71 of the ring counter 46. This is applied with a constant signal from line 44 to the "low" AND gate 57 to produce an output to the set input of the register flip-flop 107. The output from flip-flop 107 passes through reset OR gate 117 to the trigger terminal of control flip-flop 127 to effect energization of the electrode plate 20 of the digital actuator 11, corresponding to the most significant number in the binary coding illustrated. The electrostrictive element 12 therefore contracts to move the pivot 25 of the mirror 24 in a direction tending to restore parallelism.

If this movement is over-corrective, the photoelectric cell 31 will reconduct and the amplifier 41 will cease to conduct. The band 33 will now obscure the photo-cell 32 whose output therefore diminishes to cause an output from the amplifier 42 which triggers flip-flop 43 to de-energize line 44 and energize the "high" signal line 45. The next clock pulse fed to input 47 of the ring counter 46 produces a pulse from the output 72 which acts with the signal from the "high" signal line 45 to open the "high" AND gate 67 and pass a signal through the "high" OR gate 97 to the reset input of the register flip-flop 107. This sends a pulsed output signal to the trigger terminal of the control flip-flop 127 to deenergize the electrode plate 20 of the digital actuator.

If the contraction of the digital actuator element 12 from the energization 20 is under-corrective, the "low" signal remains on the line 44, the "high" signal line 45 has no signal thereon, and the output from 72 of the ring counter 46 is the only signal applied to the "high" AND gate 67 so that it does not conduct and no signal passes beyond this point. Therefore, the electrode plate 20 of the digital actuator will, in this condition of under-correction, remain energized.

The third clock pulse from 87 to the ring counter input 47 will produce an output signal at the terminal 73. If the "low" signal bus 44 is energized from the interferometer flip-flop 43, the "low" AND gate 56 has an output to the set input of the register flip-flop 106 which passes a triggering signal through the reset OR gate 116 to the digital actuator control flip-flop 126. Flip-flop 126 effects continuous energization of the actuator electrode 19, corresponding to the second most significant figure in the digital code. The actuator element 12 now contracts physically from the field produced by the electrode 19 and the situation exists with respect to over-correction movement and under-correction movement as previously described, that is, if still under-corrective, the "low" signal line remains energized and the electrode plate 19 continues to be energized also. On the other hand, if over-corrective, the "low" signal line is cut off and the "high" signal line 45 is energized to produce a signal through the AND gate 66 when the ring counter output terminal 74 passes a signal which, in turn operates through 96, 106 and 126 to deenergize the electrode plate 19.

The ring counter continues to pass successive pulsed outputs from its terminals 75 through 86, in that order, to sample whether the electrode plates corresponding to the other digital numbers should be energized or de-energized to effect a matching balance in the interferometer system. Thus, ring counter output signals from terminals 75 and 76 will sample and determine whether the actuator electrode 18 should be energized. Similarly, output from terminals 77 and 78 will determine whether the actuator plate 17 should be energized, and the sampling continues in sequence through the electrodes of the actuator until a substanially balanced condition is reached with the sampling of the least significant actuator plate. Arrival of the 16th clock pulse at the input 47 of the ring counter completes its cycle with an output pulse from terminal 86, and the ring counter will yield no further output pulses until after it is reset by a pulse applied to its reset 48. It will be seen that any desired number of stages for the digital number may be used, and the greater the number of stages, within practical limits, the greater the accuracy of the transducer.

The matrix is then in a static, matched state resulting from the sampling cycle, with certain of the actuator electrodes energized to produce a substantially balance condition at the interferometer, and with the terminals corresponding to these electrodes energized at the output register to read out the binary digits of the digital number corresponding to the value of the physical condition being measured. This static condition of the matrix continues until the arrival of a "read" pulse from the programmer on the line 129. This read pulse may be programmed at any desired frequency, not greater than the length of a complete ring counter cycle.

The read pulse from the programmer passes from line 129 to the inhibit input of the inhabit AND gate 88 to cut off this gate and prevent clock pulses from 87 passing therethrough to the ring counter input 47. The read pulse is sufficiently long to permit the delays provided by the elements 132 and 134 and resetting of the elements to be hereinafter described, while the inhibit AND gate 88 is non-conducting. From the delay element 132, the reset delay flip-flop 133 is "set" to pass a pulse to the reset 48 of the ring counter 46 and to the reset line 98 and, through delay element 134, to the reset line 128. The pulse at reset 48 resets all of the flip-flops within the ring counter 46 for a new cycle to be instituted by the next clock pulse to reach the triggering input 47 of the ring counter. This occurs immediately on setting of the flip-flop 133.

The signal pulse from flip-flop 133 also passes immediately from line 98 through the "high" OR gates 90–97 to the reset inputs of the register flip-flops 100–107 which are thereby cleared to reset condition. The signal pulse from the flip-flop 133 is delayed by the element 134 until the register flip-flops 100–107 have been reset, and then a signal is transmitted from line 128 to the reset inputs of the digital actuator control flip-flops 120–127 which are thereby cleared to reset positions to effect deenergization of all of the actuator electrodes 13–20.

With the termination of the read pulse on line 129, the inhibit input to gate 88 terminates, and this gate becomes conductig to pass the clock pulses to reset the flip-flop 133 and to initiate a new cycle of sequential outputs from the ring counter 46. This starts a new sampling and matching in the matrix to balance the interferometer system and establish a new digital read-out for the value of the physical condition being read. This matching in the transducer matrix to balance the system occurs each time a read pulse is forwarded from the programmer, and the entire operation occurs at digital computer speed so that the transducer output supplies information of a nature and at a speed to be directly utilized in digital computer operations. The transducer is, however, not limited to operation with computers, as its digital output may provide a visual reading, and its electrical digital signals may be used for controlling digital actuators, generally.

The exemplification of the invention illustrated in FIGURE 5 utilizes a magnetostrictive actuator element and illustrates a simplified error signalling and manual matching technique. Here the bellows 141 is subjected internally to a physical pressure condition which it is desired to measure. The bellows 141 is connected through an insulating pin 142 to an electrical contact 143 connected through a flexible conductor 144 to a battery or other sources of power 145. Cooperating with the electrical contact 143 are a pair of electrically conducting elements 146 and 147 insulated from each other at 148 and mounted by an insulator 149 to the movable end of a magnetostrictive rod 151 whose other end is fixedly mounted. In series with the conducting elements 146 and 147 are signal lights, a "low" signal light 152 and a "high" signal light 153. A number of ferromagnetic materials have magnetostrictive properties to various degrees, and suitable materials may be taken from the group of nickel, cobalt and alloys thereof with iron.

A plurality of electrical coils, 160 through 167, are disposed about the rod 151, the digital actuator being broken away so that coils 164, 165 and 166 are not shown in FIGURE 5. The coils 160 through 167 have one of their ends connected to a common line 168 which is connected to one terminal of the battery 145. The other ends of the coils 160 through 167 are connected through terminals, or indicator lights, or both, in an output register 169 and through switches 170 through 177, respectively, to the other terminal of the battery 145. The coils 160 through 167 have their number of turns substantially in binary progression, with the least significant digit represented by a standard unit number of turns in coil 160. Then, where the magnetostrictive rod 151 has a linear response, coil 161 will have twice as many turns as coil 160, coil 162 four times as many turns as coil 160, coil 163 eight times as many turns as coil 160, and so on through the stages of the digital actuator for as many stages are required for the desired accuracy. The most significant figure illustrated corresponds to binary digit $2^7$, where the number of turns in coil 167 is 128 times the unit number of turns in coil 160. Where the physical movement of the magnetostrictive rod 151 is not linear with respect to the field strength in which it is disposed, the variation from linearity can be taken care of by varying the number of turns in the coils from the strict binary progression described.

In the operation of the magnetostrictive actuator of FIGURE 5, an increase in the pressure condition being examined will cause the bellows 141 to expand and move the electrical contact 143 to the right, as shown in the drawing, until it contacts the conducting element 147. This closes the circuit through the "low" signal light 152 to the battery 145 and gives a visual indication that the system is unbalanced. Assuming that all of the switches 170 through 177 are open at this time, the switch 177 will be first closed to sample matching by energizing coil 167, corresponding to the binary digit of the greatest significance. Closing of switch 177 connects the coil 167 to battery 175 and establishes a magnetic field in the magnetostrictive rod 151 from the current flowing through the turns of the coil. This causes the rod 151 to contract so that its free end moves toward the right, as viewed in FIGURE 5.

If the movement of the rod 151 is over-corrective, the conducting element 146 will be moved into contact with the contact 143 to light the "high" signal light 153 and this informs the operator that too much correction has been applied and that the switch 177 should be opened. If, on the other hand, the light 152 is still illuminated, the operator is informed that the movement was under-corrective, and he closes the next switch in line, 176 (not shown).

The same sampling is carried out, by opening and closing the switches 170 through 177 in reverse sequence, starting with the switch controlling the most significant coil and proceeding down the line, until the insulation 147 is placed opposite the electric contact 143 and both lights 152 and 153 are turned off. At this time the system is rebalanced and the terminals or lights in the output register 169 which are energized will give a digital number of the value of the analog pressure condition being measured. With the visual arrangement of FIGURE 5, the transducer may remain static until such time as either of the lights 152 or 153 is illuminated, at which time the transducer system may be put back in balance by matching the movement of contact 143 with the movement of the free end of rod 151, as previously described.

Figure 4:
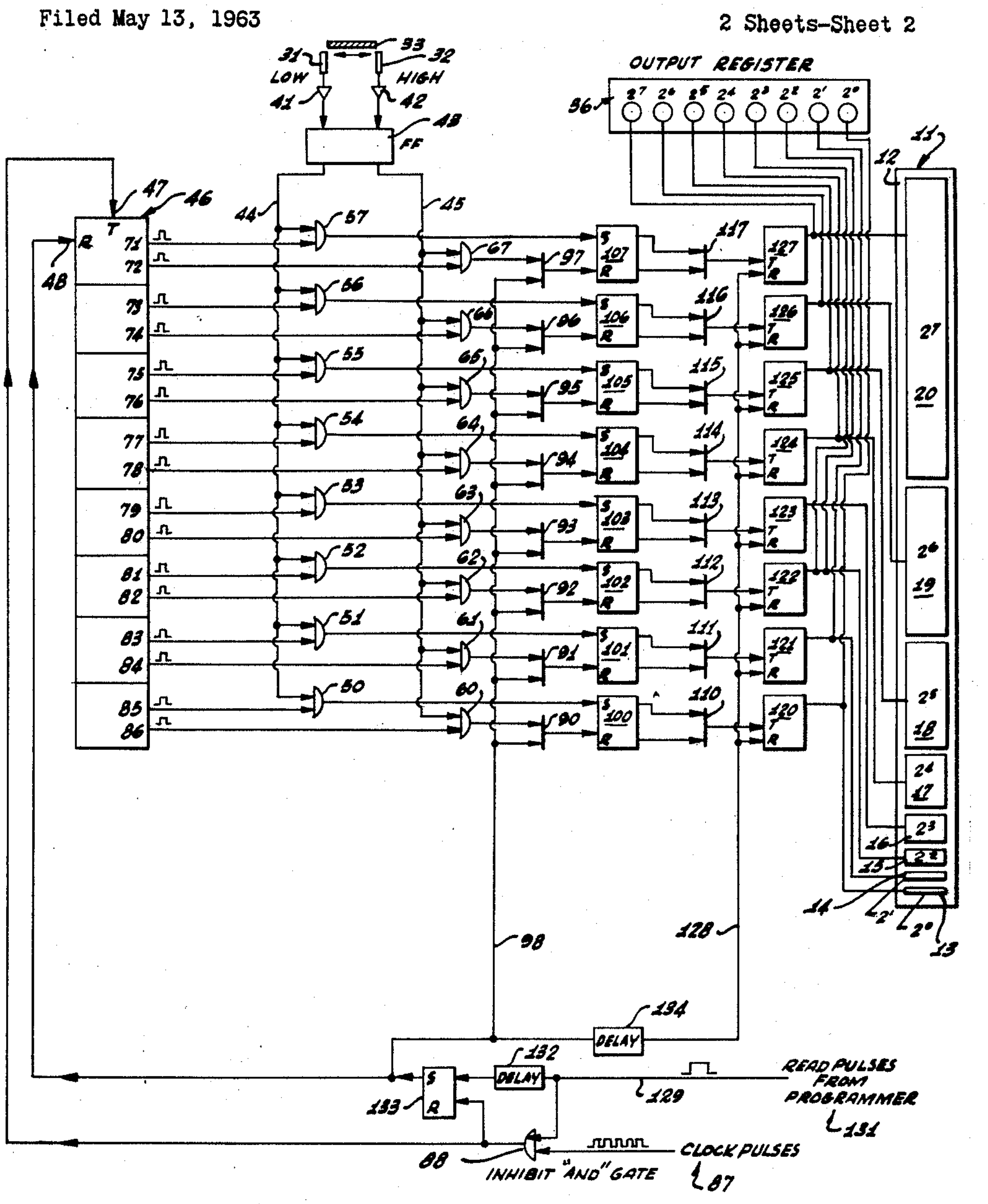
FIGURE 4 is a logic diagram of a matrix for automatically matching and giving a direct digital value of a physical condition.

It will be understood that the magnetostrictive digital actuator of FIGURE 5 may be substituted for the electrostrictive digital actuator 11 in FIGURES 3 and 4, and the matching and digital read-out accomplished automatically, with digital computer speed, using the logic matrix of FIGURE 4.

Conversely, the electrostrictive digital actuator of FIGURES 1 and 2 may be substituted for the magnetostrictive digital actuator of FIGURE 5 and manual or other simplified matching arrangements employed to secure the digital read-out for the analog physical condition being examined.

FIGURE 6 illustrates a direct digital transducer employing the magnetostrictive digital actuator of FIGURE 5 in a force-balancing system in which a pressure responsive element is returned to its null point by matching the force exerted thereon. The pressure responsive element is shown as a diaphragm 181 sealably mounted on the end of an enclosure 182 by a ring 183. The enclosure 182 is connected to a source of variable pressure P. Spaced from the enclosure 182 is a movable cup-shaped support 184 mounted on the end of the magnetostrictive rod 151. Within the support 184 is mounted a diaphragm 185 as by a ring 186. The diaphragm 185 is preferably a duplicate of diaphragm 181. The diaphragms 181 and 185 are rigidly interconnected by a post 187, the major portion of which is of insulating material and which carries two conducting elements 188 and 189 separated by a null-point indicating insulating portion 191. Cooperating with the insulating portion 191 and conducting elements 188 and 189 is a stationary conducting brush 192.

The sampling cycle for the transducer of FIGURE 6 is the same as for the transducer of FIGURE 5 and is determined by the engagement of one of the elements 188, 189 with the stationary brush 192 when the force-balance system is out of balance. The coils 160-167 are selectively energized to bring the insulating portion 191 into contact with the brush 192, at which time the force exerted on the diaphragm 181 by the pressure P will be balanced by the tensile force imparted by the mechanically stressed diaphragm 185. The diaphragm 181 will thereby be returned to its null position after each movement out of position caused by a change in the pressure P.

It is therefore seen that the applicant has provided a digital actuator physically movable in increments in response to incremental stimulation from electrical fields which may be electrostatic or electromagnetic in nature, and the term "electrical field" as used herein and in the appended claims is intended to be generic to both electrostatic and electromagnetic fields. One aspect of the invention provides a direct acting digital actuator moving in digital increments in response to digital stimulation from electrical signals. By selected relations between the areas of the electrodes for the electrostatic case and between the coil turns for the electromagnetic case, the digital actuator can be made to effect desired incremental physical movements in accordance with any selected coded information.

The direct digital transducer according to the present invention may employ the digital actuators responsive to electrical fields disclosed herein or other digital actuators having the required accuracy and speed of response, such as digital torque motors. The arrangement specifically illustrated and described provides digital accuracy and a speed of response comparable to digital computer operation, in a digital read-out of an analog variable without converting to analog signals at any level in the system. The use of the interferometer provides extreme accuracy of response of the sensor for small movements of the condition-responsive element and of the digital actuator; however, it will be apparent that the transducer is not limited to an interferometer sensor, as various other sensors may obviously be used with the automatic logic arrangement for matching and read-out. Also, the transducer may take any form between fully automatic, extremely accurate, computer speed type operation provided by the logic matrix of FIGURE 4, to a simple manual matching arrangement, such as illustrated in FIGURES 5 and 6.

While certain preferred embodiments of the invention have been specifically illustrated and described in accordance with the requirements of the patent statutes, it will be understood that the invention is not limited thereto, as many variations will be apparent to those skilled in the art, and the invention is to be given its broadest interpretation within the terms of the following claims.

I claim:

1. A digital actuator comprising: a movable member of a material which changes in physical dimension when subjected to an electrical field; and a plurality of means for applying electrical fields to said member, said means being separately energizable to apply said fields in increments to produce incremental movement of said member.

2. A digital actuator comprising: a movable member of a material which changes in physical dimension when subjected to an electrical field; and a plurality of means for applying electrical fields to said member, said means being separately energizable to apply said fields in increments to produce incremental movement of said member, said means varying in field producing ability substantially in accordance with the progression of a selected numerical code.

3. A digital actuator comprising: a movable member of a material which changes in physical dimension when subjected to an electrical field; and a plurality of means for applying electrical fields to said member, said means being separately energizable to apply said fields in increments to produce incremental movement of said member, said means varying in field producing ability substantially in accordance with the progression of a selected numerical code to produce movement of said member corresponding to a numerical value whose code numbers determine the ones of said means to be energized.

4. A digital actuator comprising: a movable member of an electrostrictive material which changes in physical dimension when subjected to an electrostatic field; and a plurality of electrodes for applying electrostatic fields to said member, said electrodes being separately energizable to apply their fields incrementally and discretely and varying in area substantially in accordance with the progression of a selected numerical code.

5. A digital actuator defined in claim 4, in which the code is binary and the areas of said electrodes vary in accordance with the exponential series of the number 2.

6. A digital actuator comprising: a movable member of magnetostrictive material which changes in physical dimension when subjected to an electromagnetic field; and a plurality of coils about said material for inducing electromagnetic fields therein, said coils being separately energizable to apply their fields discretely and incrementally, and varying in number of ampere turns substantially in accordance with the progression of a selected numerical code.

7. The digital actuator defined in claim 6 in which said numerical code is binary and the turns of said coils vary in number in accordance with the exponential series of the number 2.

8. A direct digital transducer providing a digital read-out of an analog function without intermediate conversion to an analog number, comprising: means responsive to an analog function; a digital actuator; a sensor for detecting mis-matching between said means and said actuator and producing an error signal including information of the direction of the mis-matching; means for selectively energizing said digital actuator to produce incremental movement thereof to reestablish the matching balance in the system; and means providing a digital number output representing the energization of said digital actuator.

9. A direct digital transducer providing a digital read-out of an analog function without intermediate conversion to an analog number, comprising: means responsive to an analog function; a digital actuator; a sensor for detecting mis-matching between said means and said actuator and producing an error signal including information of the direction of the mis-matching; means for energizing said digital actuator in accordance with the progression of a selected numerical code to effect a matching balance in said system; and means giving a digital number output in said selected code representing the energization of said actuator.

10. The transducer defined in claim 9 in which said digital actuator includes a member which changes in physical dimension when subjected to an electrical field and the energizing means for the actuator includes means for applying electrical fields to said member discretely and incrementally.

11. The transducer as defined in claim 10 in which said member is electrostrictive and the energizing means are electrodes for establishing electrostatic fields through the member, and in which the areas of the electrodes vary substantially in accordance with the progression of the selected numerical code.

12. The transducer defined in claim 10 in which said member is magnetostrictive and said energizing means includes electrical coils for inducing electromagnetic fields in said member, and in which the turns of the coils vary in number substantially in accordance with the progression of the selected numerical code.

13. The transducer as defined in claim 8 in which said sensor includes an interferometer in which mirror movements are effected by said function-responsive means and by said digital actuator to effect movement of fringes produced in the interferometer.

14. The transducer defined in claim 13 in which the sensor further includes means for detecting movements of the fringes, and the direction thereof, caused by movements of the interferometer mirror.

15. The transducer defined in claim 9 including a logic matrix operating automatically in response to a directing signal to effect sequential sampling from the most significant energizing means of the digtal actuator to the least significant, in sequence, to effect matching of the system.

16. The transducer defined in claim 15 in which said logic matrix includes a ring counter having outputs double in number to the number of stages of the digital actuator and giving output signals discretely and in sequence to low and high mis-match circuits of each stage of the digital actuator from the most significant to the least significant stage.

17. The transducer defined in claim 16 including: means for resetting said logic matrix and ring counter to perform a new matching operation and provide a new digital read-out for the analog function, said resetting means being responsive to a directing electrical signal.

18. The transducer defined in claim 9 including a force balance means disposed between said digital actuator and function responsive means and operated by movement of the actuator to balance a force exerted by said function responsive means.

References Cited in the file of this patent

UNITED STATES PATENTS 2,995,736 Tellerman -------------- Feb. 8, 1960

OTHER REFERENCES

Publication: Control Engineering, an article titled "Digital Transducer: Force Input . . . Binary Coded Output," pages 107–109, June 1961.